(12) United States Patent
Hammerschmidt et al.

(10) Patent No.: US 7,203,618 B2
(45) Date of Patent: Apr. 10, 2007

(54) METHOD AND DEVICE FOR ADJUSTING A DETERMINATION RULE OF AN ANGLE SENSOR

(75) Inventors: Dirk Hammerschmidt, Villach (AT); David Tatschi, Villach (AT); Wolfgang Granig, Sachsenburg (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/130,522

(22) Filed: May 17, 2005

(65) Prior Publication Data

US 2005/0278137 A1 Dec. 15, 2005

(30) Foreign Application Priority Data

May 17, 2004 (DE) .................. 10 2004 024 398

(51) Int. Cl.
*G06F 15/00* (2006.01)

(52) U.S. Cl. .................. 702/151; 702/94; 702/95; 702/150

(58) Field of Classification Search .................. 702/85, 702/87, 90, 94–95, 104, 150–151, 152; 324/207.12, 324/207.21, 207.25
See application file for complete search history.

(56) References Cited

U.S. PATENT DOCUMENTS 6,173,501 B1 * 1/2001 Blank et al. .................. 33/356
6,686,733 B2  2/2004 Muth .................. 324/202
2003/0042894 A1 * 3/2003 Waffenschmidt ....... 324/207.21
2004/0107063 A1 * 6/2004 Weilenmann ................ 702/85

FOREIGN PATENT DOCUMENTS

| | | |
|---|---|---|
| DE | 100 52 609 A1 | 5/2002 |
| DE | 101 30 988 A1 | 1/2003 |
| DE | 101 48 918 A1 | 4/2003 |
| DE | 101 54 153 A1 | 5/2003 |
| DE | 101 54 154 A1 | 5/2003 |
| DE | 101 63 528 A1 | 7/2003 |
| EP | 1 293 752 A1 | 9/2002 |

* cited by examiner

*Primary Examiner*—Bryan Bui
(74) *Attorney, Agent, or Firm*—Baker Botts L.L.P.

(57) ABSTRACT

A method for adjusting a determination rule for an error compensation of an angle sensor is designed to detect a first component of a direction along a first axis and a second component of a direction along a second axis, and to determine an angle of the direction according to the determination rule based on the first and second components. The method includes: detecting values of component pairs consisting of two predetermined components for the calculation of offset and/or amplitude and/or axis-angle errors. One variant consists of entering the component value pairs into an ellipse equation system, determining at least one ellipse coefficient from the ellipse equation system, and adjusting the determination rule depending on the one determined ellipse coefficient or the plurality of determined ellipse coefficients. A further variant is the determination of selected points, extremums or zero points for the determination of the offset and/or amplitude and/or axis-angle errors.

29 Claims, 12 Drawing Sheets

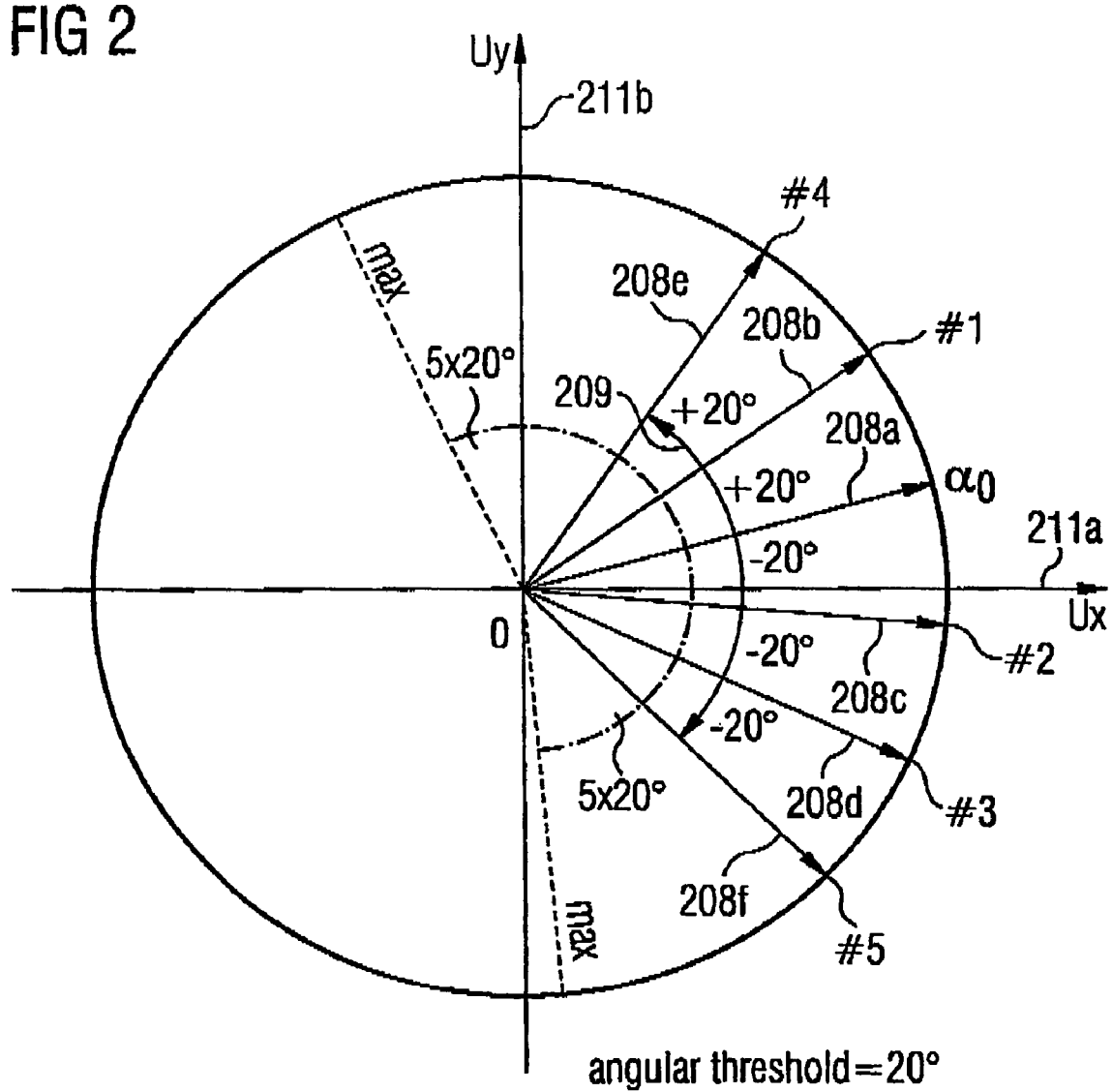

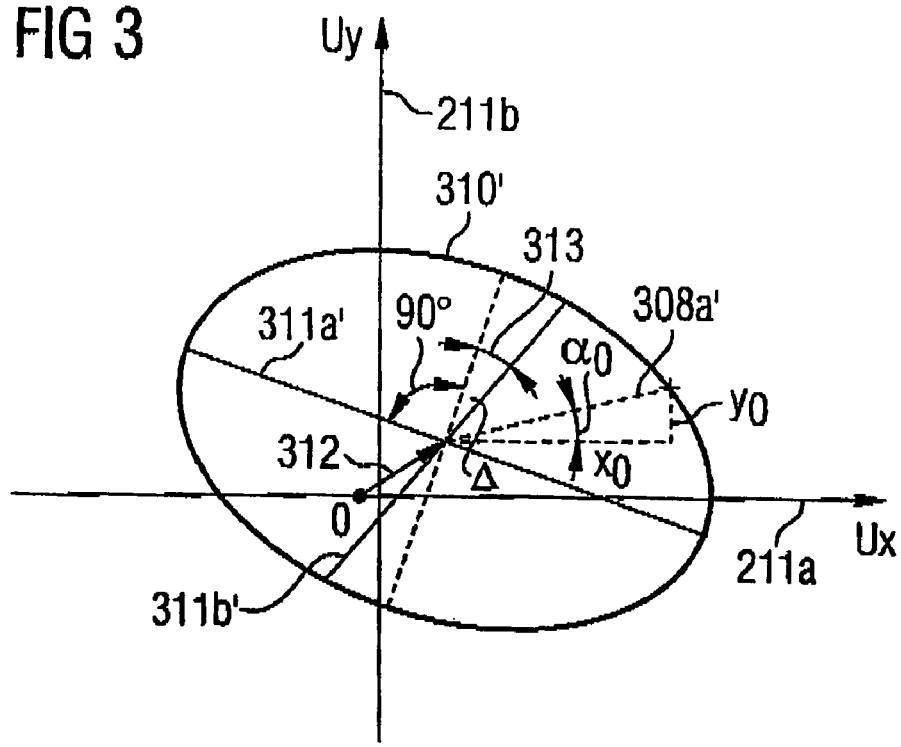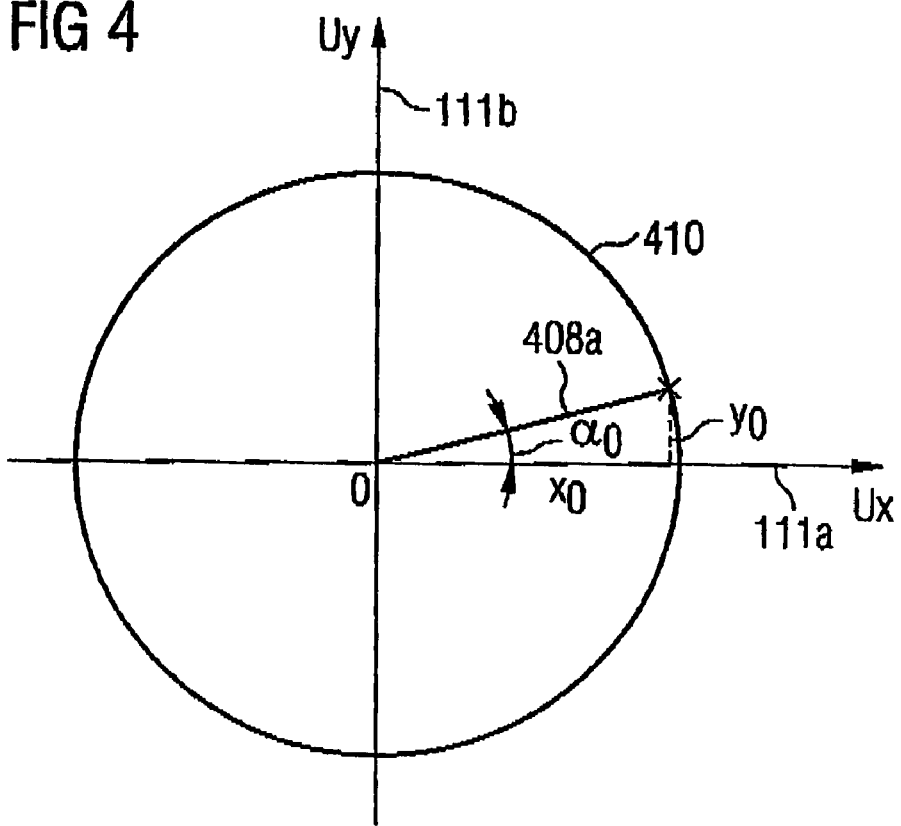

METHOD AND DEVICE FOR ADJUSTING A DETERMINATION RULE OF AN ANGLE SENSOR

CROSS-REFERENCE TO RELATED APPLICATION

This application claims priority from German Patent Application No. 10 2004 024 398.0, which was filed on May 17, 2004, and is incorporated herein by reference in its entirety.

TECHNICAL FIELD

The present invention relates to methods and devices for adjusting a determination rule, as they may be employed particularly in angle sensors.

BACKGROUND

Angle sensors are used, for example, in the area of automobiles for determining a travel direction. The angle detection is usually based on a magnetic field measurement by a magnetic field sensor. The detected measurement values are subsequently evaluated. Based on the measured values indicating a detected magnetic field direction, an angle is calculated.

For magnetic field measurement, sensor elements such as AMR, GMR or Hall sensors are used which differ by two different pre-magnetization directions. If these elements are connected to a bridge, the result is a difference voltage dependence on the magnetic field direction following a sine function. If a second bridge is added whose sensor element preferred direction is orthogonal to that of the first bridge, the result is a second difference voltage offset by 90°, i.e. a cosine function. These two difference voltages form a vector describing a circular path for magnetic field rotation in the voltage plane. This circular path will be referred to as measurement circle below.

FIG. 13 shows a possible realization of a magnetic field sensor 1301 in the form of a GMR measurement bridge. The magnetic field sensor 1301 comprises first sensor elements 1302 aligned with a first preferred direction 1304, and second sensor elements 1303 aligned with a second pre-magnetization direction 1305. Four first sensor elements 1302 are connected to a bridge circuit. Also, four second sensor elements 1303 are connected to a second bridge circuit. The first measurement bridge is designed to detect a component of the first preferred direction 1304 of a magnetic field, and the second measurement bridge is designed to detect a second component of the second preferred direction 1304 of the magnetic field to be detected. The first measurement bridge is designed to generate a first bridge voltage Ux 1306 corresponding to the first component of the magnetic field, i.e. the component along the first pre-magnetization direction or preferred direction. The second measurement bridge is designed for generating a second bridge voltage Uy 1307 corresponding to a second component, i.e. the component of the magnetic field to be detected along the second pre-magnetization direction.

The principle of the rotational angle measurement is based on the fact that a two-dimensional coordinate system is sufficient for the determination of an angle. The measurement system provides an X value and a Y value related to an origin of the coordinate system, for example the voltages Ux, Uy of a measurement point shown in FIG. 13. From this XY value pair, the associated angle of the measurement point may be calculated by means of methods suitable for a microprocessor. If all measurement points are located on a circular path, the calculated angle describes the absolute position of the rotational angle exactly. If, for example, a magnet is rotated above two magnetic sensors, and if, for example, one sensor is orientated into the X axis and the second sensor into the Y axis, the sine and cosine components of the circular movement are detected. The arc tangent function atan y/x allows to conclude the angle. As the angle gives a direction of the measurement point with respect to the coordinate system, this application may be employed as an angle sensor.

FIG. 14 illustrates the principle of the angle measurement. An X component and a Y component are plotted in a right-angled coordinate system. A first component 1406, in this case the X component, is plotted in the direction of a first axis 1411a, in this case the X axis, corresponding to a detected magnetic field direction 1408. A second component 1407, in this case the Y component, is plotted in the direction along a second axis 1411b, in this case a Y axis. From the X and Y components detected, for example, by the magnetic field sensor shown in FIG. 13, an angle A of the magnetic field direction 1408 may be calculated. The direction vector of the magnetic field direction 1408 corresponds to a diagonal of a rectangle subtended through the X component 1406 and the Y component 1407. Thus, the angle A of the magnetic field direction 1408 may be calculated by an arc tangent calculation from the X component 1406 and the Y component 1407.

If, however, the measurement points are not located on a circular path, but on an inclined, offset elliptical path with non-orthogonal axes, there will be a deviation of the calculated angle from the actual angle of a direction to be detected.

Deviations from the orthogonality between the two bridge elements, differences in the bridge sensitivities and different offset errors result in a deviation from the ideal circular path. The general course of the path if elliptical, has an offset center point and an inclined axis position. The mentioned influences are basically dependent on age and temperature.

Manufacturing and assembly of the angle sensor also result in errors which must be eliminated in the application of the sensor element to guarantee a correspondingly high measurement accuracy of the angle. Three types of errors may occur.

An offset error causes an offset in the X and/or Y axis. Due to manufacturing and temperatures in operation, an offset must be expected. This leads to a displacement of the measurement circle.

An amplitude error causes an amplitude in the X and/or Y axis. Due to manufacturing and especially temperature, an amplitude error must be expected. This leads to a distortion of the circle into an ellipse, which, however, still has the main axes in the X and Y axes.

An angle error between the X and Y components will occur if the sensors are not positioned by 90° or if the sensors are not accurately constructed.

In summary, due to the sum of the occurring errors, the circle to be represented becomes a general ellipse which may be located offset in any angle around the origin.

FIG. 15 shows a distortion of the circular path to an elliptical path caused by influences. An errored X component 1506' and an errored Y component 1507' of a detected magnetic field direction 1508' subtend a vector diagram from which an errored angle A' of the detected magnetic field direction may be calculated. Due to the errored X component 1506' and the errored Y component 1507', the direction vector 1508' does not describe a circle around the origin of the X axis 1411a and the Y axis 1411b, but an ellipse 1510' around a center point of an errored X axis 1511a' and an errored Y axis 1511b'. An origin 1512 of the circle coordinate system differs from an origin 1512' of the ellipse coordinate system. In addition, the axes of the ellipse coordinate system 1511a', 1511b' are rotated with respect to the circle axes 1411a, 1411b. The errored ellipse axes 1511a', 1511b' can further comprise an angle deviating from 90° with respect to each other.

In order to reduce the offset error and the amplitude error and/or gain error, the solution is a fixed calibration of the offset and gain after manufacturing. However, this has the disadvantage that offset and gain errors occurring during operation cannot be compensated. Angle errors are currently not calibrated.

DE 10154153 A1 describes a solution in which only an offset compensation with an axis intersection method and an N points method are used. However, this requires a control loop with all related problems like settling, stability, etc.

DE 10154154 A1 uses an amplitude value of a resultant in order to manage a temperature offset compensation therefrom via a table. Again, neither gain nor angle error are corrected.

DE 10052609 A1 uses a third order polynomial for the offset compensation. This polynomial must be determined during manufacturing and is constant for the rest of the life span. Again, no gain or angle correction is performed.

Due to the lack of an automatic calibration possibility, each sensor cell must be put into operation and calibrated during manufacturing. In an expensive calibration, measurement points must be incorporated which, in the worst case, also are to be detected under various environmental conditions, such as various temperatures. This requires a test setup with a rotating magnetic field, as various angular positions are required. A digital block realized in hardware (HW) performs the angle calculation. This may be, for example, iterative methods such as the CORDIC (coordinate rotation digital computer) algorithm, multiplying methods or table methods. The chip calculates field amplitude and field angle which are read out via a sensor control chip interface. An external program evaluates the read out measurement pairs and determines corresponding correction coefficients. These are then written to a non-volatile memory in the sensor chip. As the calibration is performed only once, runtime influences and sensor installation influences are not compensated. In order to be able to maintain the specification across the temperature range, a complex and area-intensive temperature compensation circuit must be used, and the duration of the calibration measurements is significantly increased and thus made more expensive by the long temperature changing periods.

SUMMARY

It is the object of the present invention to provide a method and a device allowing high measurement accuracy of an angle sensor.

In accordance with a first aspect, the present invention provides a method for adjusting a determination rule of an angle sensor designed to detect a first component of a direction along a first axis and a second component of the direction along a second axis, and to determine an angle of the direction according to the determination rule based on the first and second components, the method having the steps of detecting five component value pairs for five different directions, wherein a component value pair includes a first component value for the first component and a second component value for the second component; and adjusting the determination rule depending on the five component value pairs.

In accordance with a second aspect, the present invention provides a method for adjusting a determination rule of an angle sensor designed to detect a first component of a direction along a first axis and a second component of the direction along a second axis, and to determine an angle of the direction according to the determination rule based on the first and second components, the method having the steps of detecting a first maximum value and a first minimum value of a predetermined one of the first and second components; and adjusting the determination rule depending on the first maximum value and the first minimum value.

In accordance with a third aspect, the present invention provides a method for adjusting a determination rule of an angle sensor designed to detect a first component of a direction along a first axis and a second component of the direction along a second axis, and to determine an angle of the direction according to the determination rule based on the first and second components, the method having the steps of detecting a pair of first zero passage values for the second component associated with a zero passage of the first component; and determining a correction factor for the second component based on the pair of first zero passage values, wherein the correction factor is part of the determination rule.

In accordance with a fourth aspect, the present invention provides a device for adjusting a determination rule of an angle sensor designed to detect a first component of a direction along a first axis and a second component of the direction along a second axis, and to determine an angle of the direction according to the determination rule based on the first and second components, the device having a detector designed to detect five component value pairs for five different directions, wherein a component value pair includes a first component value for the first component and a second component value for the second component; and an adjusting unit designed to adjust the determination rule depending on the five component value pairs.

In accordance with a fifth aspect, the present invention provides a device for adjusting a determination rule of an angle sensor designed to receive a first component of a direction along a first axis and a second component of the direction along a second axis, and to determine an angle of the direction according to the determination rule based on the first and second components, the device having a detector designed to detect a first maximum value and a first minimum value of a predetermined one of the first or second components; and an adjusting unit designed to adjust the determination rule depending on the first maximum value and the first minimum value.

In accordance with a sixth aspect, the present invention provides a device for adjusting a determination rule of an angle sensor designed to detect a first component of a direction along a first axis and a second component of the direction along a second axis, and to determine an angle of the direction according to the determination rule based on the first and second components, the device having a detector designed to detect a pair of first zero passage values for the second component associated with a zero passage of the component; and a determination unit designed to determine a correction factor for the second component based on the pair of first zero passage values.

In accordance with a seventh aspect, the present invention provides a computer program with a program code for performing the method for adjusting a determination rule of an angle sensor designed to detect a first component of a direction along a first axis and a second component of the direction along a second axis, and to determine an angle of the direction according to the determination rule based on the first and second components, when the computer program runs on a computer, the method having the steps of detecting five component value pairs for five different directions, wherein a component value pair includes a first component value for the first component and a second component value for the second component; and adjusting the determination rule depending on the five component value pairs.

In accordance with an eighth aspect, the present invention provides a computer program with a program code for performing the method for adjusting a determination rule of an angle sensor designed to detect a first component of the direction along a first axis and a second component of a direction along a second axis, and to determine an angle of the direction according to the determination rule based on the first and second components, when the computer program runs on a computer, the method having the steps of detecting a first maximum value and a first minimum value of a predetermined one of the first and second components; and adjusting the determination rule depending on the first maximum value and the first minimum value.

In accordance with a ninth aspect, the present invention provides a computer program with a program code for performing the method for adjusting a determination rule of an angle sensor designed to detect a first component of a direction along a first axis and a second component of the direction along a second axis, and to determine an angle of the direction according to the determination rule based on the first and second components, when the computer program runs on a computer, the method having the steps of detecting a pair of first zero passage values for the second component associated with a zero passage of the first component; and determining a correction factor for the second component based on the pair of first zero passage values, wherein the correction factor is part of the determination rule.

According to the present invention, a calibration of an angle sensor determining an angle from two components of a measurement circle is performed. The present invention is based on the finding that a determination rule for determining the angle may be adjusted from a plurality of direction components detected by the angle sensor. The inventive approach allows a self-calibration of the angle sensor so that errored measurement points located on an elliptical path appear as if they were on an ideal circular path around the origin. This calibration may compensate manufacturing tolerances and tolerances occurring during operation.

A considerable advantage of the present invention is that the inventive approach does not only allow compensation of offset errors of an angle measurement arrangement, but also compensation of gain and angle errors. In particular, this also means that the inventive approach is also possible when the detected direction components are not only subjected to offset and gain errors, but also to angle errors.

Another advantage is that the described methods are based on a simple algorithm which may be processed on any microcontroller or hardware. A compensation does not require any regulation, as all correction data are calculated immediately. A correction in operation may even compensate influences varying in time, particularly also temperature and aging influences.

If, according to the inventive methods, an algorithm operates during operation, i.e. online, runtime influences such as aging and temperature variations may be compensated continuously. The sensor operates in its optimum and its accuracy may be increased. An online update of the coefficients required for the adjustment of the determination rule has significant advantages. On the one hand, no additional temperature compensation on the chip is required, as the online self-calibration assumes this task. On the other hand, long-term changes are compensated. The self-calibration is independent of hardware and could alternatively also be performed only the first time, for example in a first switch-on process. The self-calibration reduces front end costs, because the calibration of the sensor is self-performed. No additional temperature compensation on the chip is required, because the online self-calibration assumes this task. No additional hardware is required for the self-calibration. Long-term changes are also compensated. Thereby, field failures are reduced and guaranteeable accuracy can be increased.

The determination rule serves for compensating an offset error or an amplitude error or an orthogonality error of the angle sensor. Determining the angle ($\Phi_{CORR}$) based on the first component and the second component corresponds to an angle measurement of the angle sensor. The five component value pairs may be consecutive first components and second components used for angle measurement so that the actual measurement is not interrupted. Adjusting the determination rule for the continuous correction and recalibration during operation of measured value pairs with respect to offset errors and/or amplitude errors and/or orthogonality errors is thus possible without interrupting an actual measurement.

The angle correction allows to use even components not located at 90° with respect to each other for the angle measurement, but also any two components as long as they are not both located on the same axis. Thus, also any two (<>90 degrees) components of the circle may be used, i.e. also sensors deliberately not offset by 90 degrees, such as 45 degrees for AMR sensors. In manufacturing, it is no longer necessary to seek the accurate manufacturing and/or assembly of the X and Y sensor components. It is a considerable advantage of the present methods that they may also be used for such sensors having components not located at 90 degrees with respect to each other.

According to an embodiment, any five component pairs are detected for adjusting the determination rule. This has the advantage that no special calibration measurement is required to detect special component pairs based on which an error correction is performed. The five component pairs required for this embodiment can be taken from a running measurement.

According to a further embodiment, four special points which are easy to determine are used for calculating all compensation data such as offset, gain and angle errors between the components. A considerable advantage of this embodiment is that, in spite of the use of only four special points, also a compensation of gain and angle errors may be performed. This embodiment uses an application of a special simple algorithm for calculating the compensation data from the points. The compensation data are calculated in one step and may also be used during operation for self-calibration. This may be performed without regulation.

BRIEF DESCRIPTION OF THE DRAWINGS

Preferred embodiments of the present invention will be explained in more detail in the following with respect to the accompanying drawings, in which:

FIG. 2 shows a measurement circle of an angle sensor according to the present invention;

FIG. 3 shows an errored measurement circle according to the present invention;

FIG. 4 shows an error-corrected measurement circle corresponding to the errored measurement circle shown in FIG. 4;

DETAILED DESCRIPTION

In the following description of the preferred embodiments of the present invention, like or similar reference numbers are used for the elements illustrated in the various drawings and acting similarly, a repeated description of these elements being omitted.

In the following, a first method and a first device for adjusting a determination rule according to an embodiment will be described. According to this first method, offset, gain and/or amplitude, and angle and/or orthogonality errors of an angle sensor may be compensated by means of five measurement points.

Figure 1:
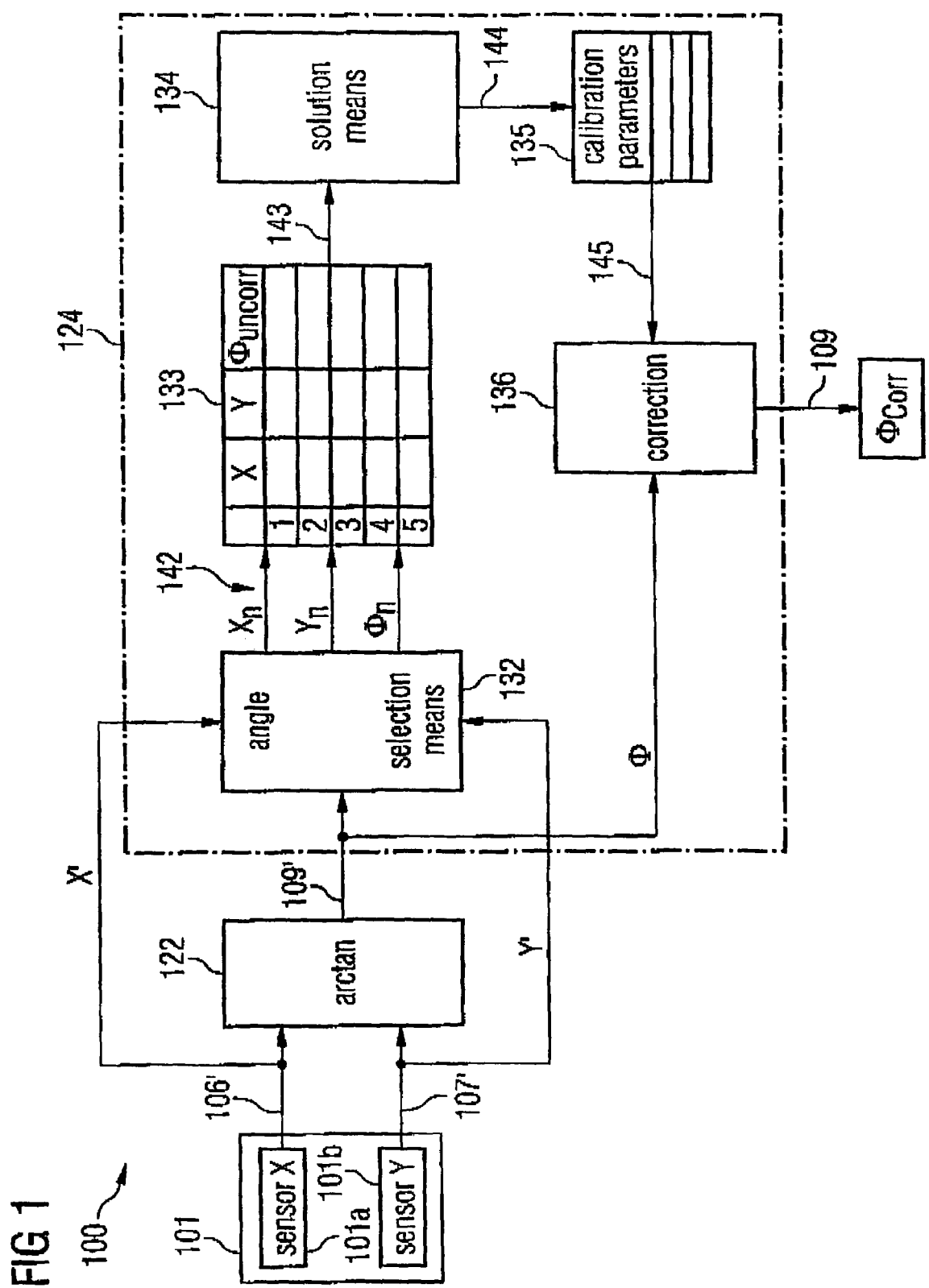
FIG. 1 shows a block circuit diagram of an angle sensor according to the present invention.

FIG. 1 shows an angle sensor 100 for determining an angle of a direction to be detected. The angle sensor 100 comprises a sensor 101, means 122 for angle calculation, and a device 124 for adjusting a determination rule. The angle sensor 100 is designed to determine an error-corrected angle $\Phi_{CORR}$ according to a determination rule based on a first component 106' and a second component 107'.

Figure 13:
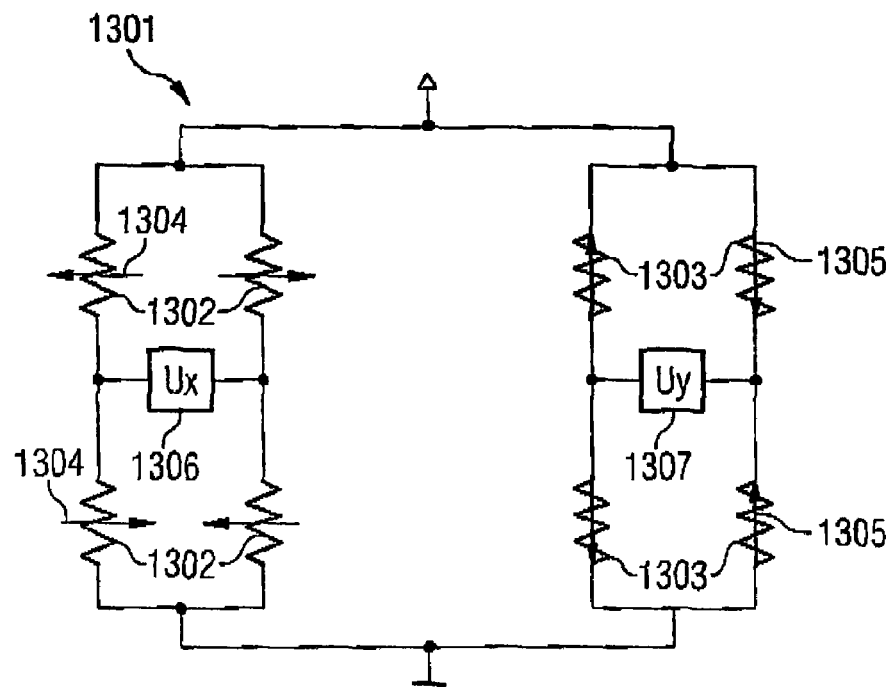
FIG. 13 shows a schematic illustration of a magnetic field sensor according to the present invention.
Figure 14:
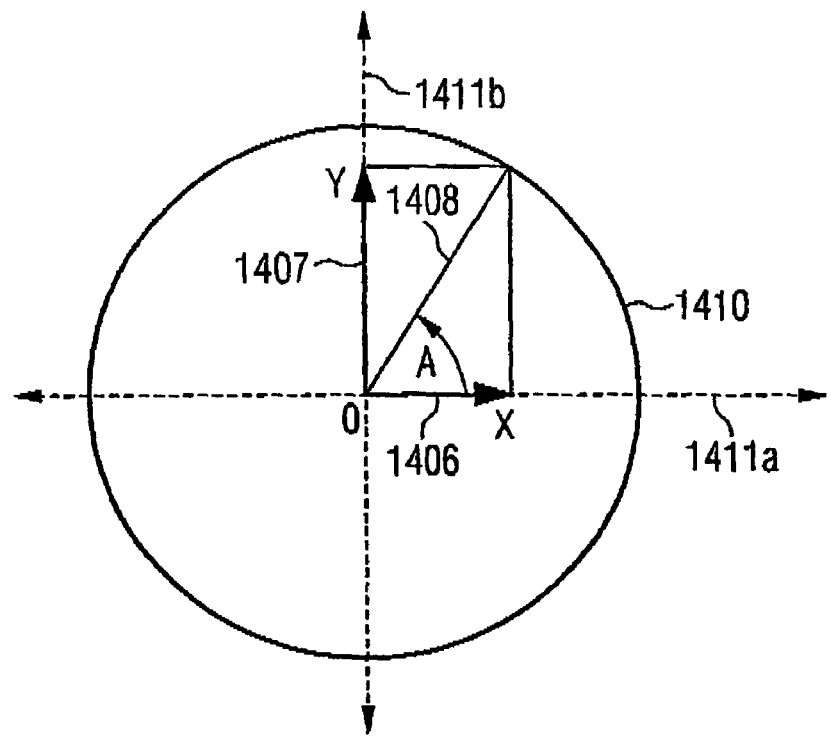
FIG. 14 shows a prior art measurement circle.

The sensor 101 may be the magnetic field sensor shown in FIG. 13. The sensor 101 comprises a sensor X as detection direction 101a for the first component 106' of the magnetic field at this location with respect to a first axis, and a sensor Y as detection direction 101b for the second component 107' of the magnetic field at this location with respect to a second axis. The sensor 101 is designed to detect the first component 106' of the direction to be detected along the first axis and the second component 107' of the direction to be detected along the second axis, and to output the first component in the form of an X component and the second component in the form of a Y component. In this embodiment, the direction along the first axis corresponds to an X direction, and the direction along the second axis corresponds to a Y direction. The X component and the Y component are errored. Therefore, an angle $\Phi$ calculated from the X component and the Y component is also errored. The angle sensor 100 is designed to generate an error-free angle $\Phi_{CORR}$ from the errored components 106', 107'.

The error-free angle $\Phi_{CORR}$ is determined by the angle sensor 100 from the X component and the Y component according to a determination rule.

The means 122 for angle calculation calculates the errored angle $\Phi$ from the errored X component and the errored Y component according to an arc tangent function.

According to this embodiment, the device 124 for adjusting a determination rule comprises selection means 132 for selecting X component values $X_N$ and Y component values $Y_N$ depending on an errored angle $\Phi_N$ determined by the means 122 for angle calculation. The device 124 for adjusting further comprises a table 133 for storing the selected component pairs $X_N$, $Y_N$ with the associated angle $\Phi_N$. Further, the device 124 for adjusting comprises a solution means 134, a parameter table 135 and a correction means 136. The table 133 is connected to the angle calculation means 132 and receives selected component value pairs 142 therefrom. In this embodiment, the table 133 comprises 15 memory cells, in which there are respectively stored an X component $X_N$, a Y component $Y_N$ and an errored angle $\Phi$ for five detected directions. The values stored in table 133 are provided as calculation values 143 to the solution means 134. The solution means 134 is designed to enter the calculation values 143 into an equation system and to determine coefficients of the equation system.

In this embodiment, the equation system is an ellipse equation system, and the coefficients to be determined are ellipse coefficients. The ellipse coefficients calculated by the solution means 134 are provided as parameters 144 to the parameter table 135 and stored by the same. The parameter table 135, in turn, is designed to output the stored parameters 144 as correction parameters 145 to the correction means 136. The correction means 136 is designed for receiving the errored angle $\Phi$ calculated by the angle calculation means 122. The correction means 136 is designed for determining the angle $\Phi_{CORR}$ according to a determination rule from the errored angle $\Phi$ which was determined from the X component $X_N$ and the Y component $Y_N$ provided by the sensor 101. The correction means 136 is further designed to adjust the determination rule depending on the correction parameters 154. The thus adjusted determination rule allows to determine the angle $\Phi_{CORR}$ so that the angle $\Phi_{CORR}$ corresponds to the actual angle of the direction to be detected by the sensor 101.

The angle selection means 132 is designed to select component pairs ($X_N$, $Y_N$) from the component values $X_N$, $Y_N$ output by the sensor element 101. The angle selection means 132 is designed to select component pairs 142 for different angular positions. If the selected component pairs 142 were located on top of each other and/or only differed by a minor angular difference, no reliable calculation of correction parameters 154 would be possible. In order to ensure that the component pairs 142 differ from each other, the angle selection means may be provided with a drag indicator and/or with angular thresholds subdividing the measurement area into smaller measurement sections.

An angle as it is output by the angle sensor is an angle with respect to a reference direction extending in a plane subtended by the axes along which sensor X and sensor Y measure the components of the magnetic field. The angle sensor is designed to detect the first component of a direction along the first axis and the second component of the direction along the second axis so that, with a variation of the direction by 360°, a vector from the first component and the second component describes an elliptical path in a right-angled coordinate system. A direction is a direction of any physical quantity, such as force or magnetic field.

FIG. 2 shows a possible selection of five measurement points by the angle selection means 132 shown in FIG. 1. The measurement points #1, #2, #3, #4, #5 are plotted in a coordinate system with an X axis 211a corresponding to a voltage component detected by a sensor in X direction, and a Y axis 211b corresponding to a Y voltage component detected by the sensor. The direction vectors 208a–e associated with the measurement points subtend a measurement circle. In addition to the five measurement points, there is plotted a reference direction value $\alpha_0$ setting a reference direction from which the angles to be determined are measured. In this embodiment, adjacent direction vectors, for example the direction vector 208b and the direction vector 208e, respectively have an angle difference of 20 degrees. The selection means is therefore designed to detect a next measurement point after the detection of a measurement point only when an angle of +20 degrees or −20 degrees has been swept. For this, the selection means may be provided with a storage device storing already detected angle values. A drag pointer forming a difference between a current angle value and an already stored angle value, for example, may prevent that further direction vectors are detected in an area of which direction vector parameters have already been stored. Alternatively, also threshold values may be used subdividing the measurement area into different subareas. When a new angle value is detected, a determination may be made via the stored angle values whether an angle value is already detected in the same subarea. In this case, the new angle value is not stored.

Due to a spacing of respectively 20 degrees between two adjacent direction vectors, all direction vectors of the five measurement points are located in an area indicated by the broken lines max. This area includes an angle area of respectively 5×20 degrees around the reference direction vector 208a. In this embodiment, an angular threshold is 20 degrees. However, another minimum angle may also be defined. Preferably, the angles setting a distance between two direction vectors are defined so that the direction vectors are distributed as uniformly as possible across the entire measurement circle.

Figure 15:
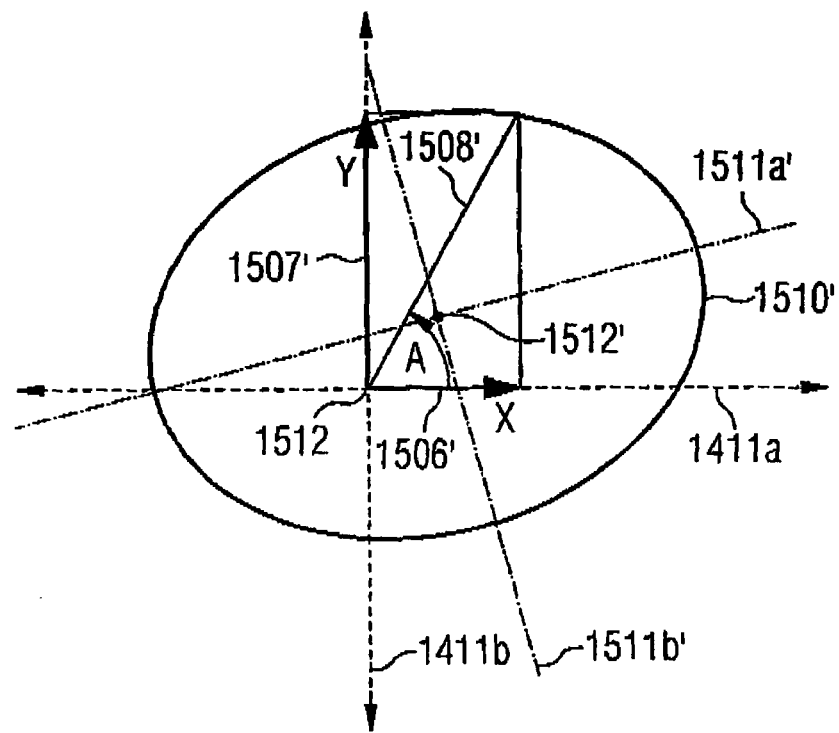
FIG. 15 shows an errored prior art measurement circle.

FIG. 3a shows an errored reference direction vector 308a' plotted into the coordinate system described in FIG. 2. The errored reference direction vector shows a direction of measurement points detected by an errored sensor. In this case, errored direction vectors do not subtend a measurement circle, as described in FIG. 15, but a measurement ellipse 310'. The ellipse axes 311a', 311b' are offset, distorted and rotated with respect to the axes 211a, 211b of the reference coordinate system. An offset error of the errored direction components can be seen in an offset 312 causing a displacement of the intersection point of the ellipse axes 311a', 311b' with respect to the intersection point of the axes 211a, 211b. The angle error causes the ellipse axes 311a', 311b' not to be perpendicular to each other, but to comprise an angle error 313 having a value Δ. In this embodiment, the reference direction vector 308a corresponds to a direction of a wheel zero position.

FIG. 4 shows an error-corrected form of the reference direction vector 408a from FIG. 3. The reference direction vector 408a is again plotted in the original coordinate system. The corrected direction vectors now subtend a measurement circle, and the reference direction vector defines a reference angle $\alpha_0$, from which angles are plotted in the following.

Figure 5:
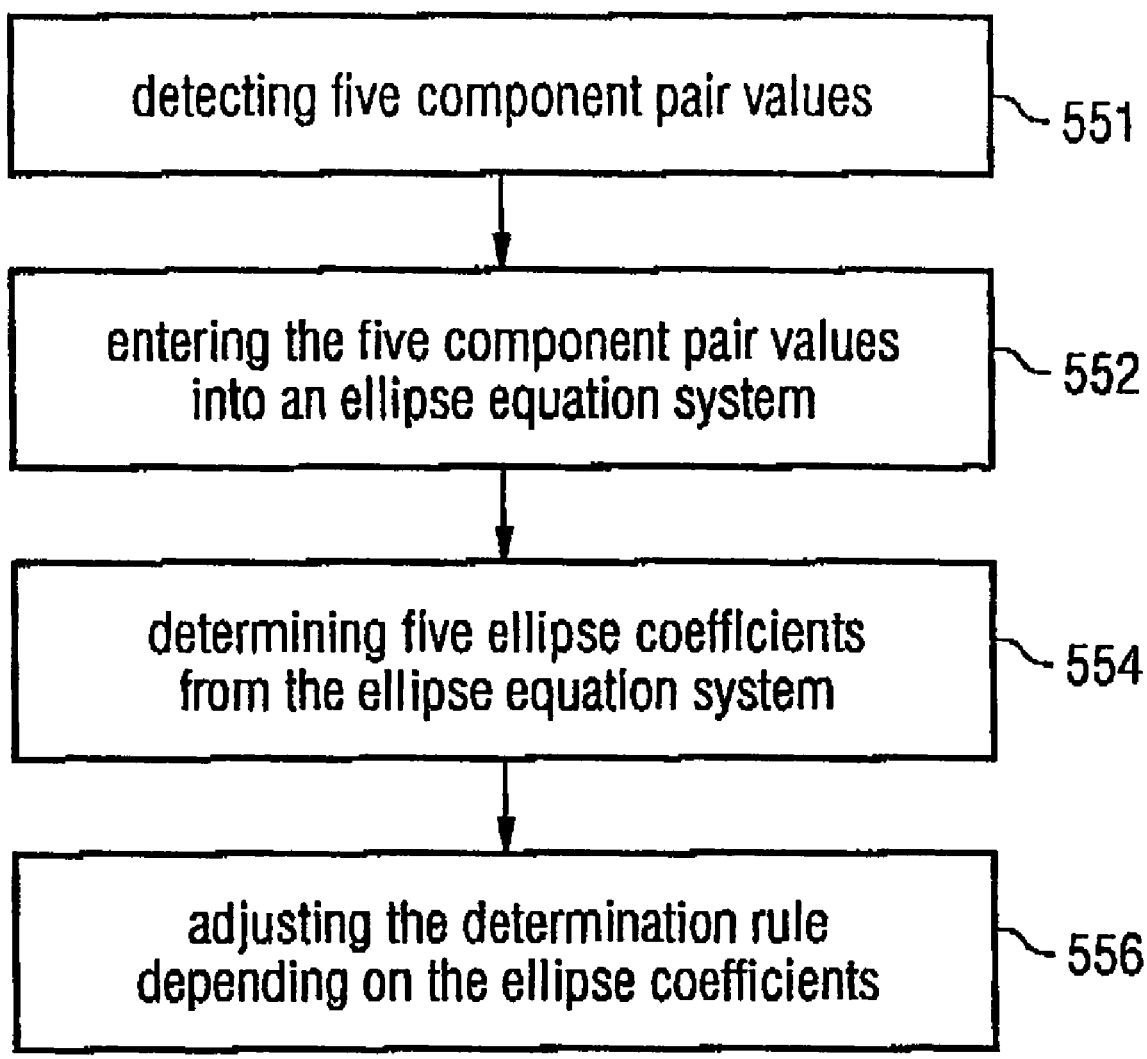
FIG. 5 shows a flow chart of a method for adjusting according to an embodiment of the present invention.

FIG. 5 shows a flow chart describing a method for adjusting a determination rule of an angle sensor. The method may be used in a device for adjusting a determination rule as shown in FIG. 1.

In a first step 551, five component value pairs are detected. These five component value pairs may be provided directly by a sensor or may be read out from a storage means. In a calibration process during operation, what is preferable used are component value pairs from a directly running measurement. These five component value pairs are errored and therefore define direction vectors which do not describe a circle, but an ellipse. Depending on the five component value pairs, the determination rule is adjusted.

In a second step 552, the five component value pairs are entered into an equation system, preferably an ellipse equation system.

In a third step 554, coefficients, i.e. in this case ellipse coefficients, are determined from this ellipse equation system. These ellipse coefficients allow to describe the ellipse described by the errored direction vectors.

Based on the knowledge of the ellipse coefficients, the determination rule for determining an angle of a direction is now adjusted in a fourth step 556. The determination rule is adjusted so that measurement errors are corrected.

If, in the third step 554, all five ellipse coefficients are determined, offset, amplitude and angle errors may be compensated. If it is known in advance that individual error components are negligible or are not to be taken into consideration, it is alternatively possible to calculate only some of the ellipse coefficients. Depending on the calculated ellipse coefficients, for example, only the offset error or only the amplitude error or only the angle error or any combination of error types may then be compensated. The described method may be performed once when manufacturing an angle sensor, once when putting the same into operation for the first time or continuously during operation. It is also possible to use the described method for determining whether the detected direction components are errored or not. If the detected direction components are determined to be errored, the method may be performed completely, and the determination rule may be adjusted correspondingly.

The self-calibration algorithm is based on the fact that each measurement point is located on an elliptical path. The general ellipse equation describes the position, inclination and form of an ellipse by five parameters with the aid of two equations. One equation describes the X coordinate of the measurement point, the second equation describes the Y coordinate. The five parameters are the following:

amplitude factor of the X component of the measurement point
amplitude factor of the Y component of the measurement point
offset of the ellipse center from the origin in X direction
offset of the ellipse center from the origin in Y direction
angle offset between the ellipse axes A determination of the coefficients is done as follows. At each valid measurement time, a microcontroller receiving and processing the values output by the sensor, for example, gets transmitted X value and Y value of the measurement point.

As the angle calculation (arc tangent) is already operational at this time, it provides an angle value. This angle value, however, is based on the assumption that the measurement points are located on a circular path, a special case of an ellipse. Therefore, this angle value represents an approximation. It has to be corrected. However, it is very well suited for a starting value for the calculation of the elliptical path coefficients. In order to obtain the n coefficients, n angle measurements are required. This leads to a non-linear equation system consisting of 2n equations and 2n unknowns. A calculation matrix may be formed.

A numerical solution algorithm, for example an approximation method according to Newton, solves this equation system. In order to guarantee reliable success of the method, starting values or estimated values are required:

Amplitude factor of the X component of the measurement point is to be 1.

Amplitude factor of the Y component of the measurement point is to be 1.

X offset of the ellipse center from the origin is to be 0.

Y offset of the ellipse center from the origin is to be 0.

Angle offset is to be 0.

The ellipse axes are to be orthogonal.

Non-corrected angle values from the CORDIC calculation serve as starting values for the angles of the measurement points.

Achieving high accuracy of the calibration requires ensuring that the gathered angle values are not too close to each other, because this increases the influence of quantization errors on the calibration. For example, a programmable drag indicator with hysteresis providing for sufficient angle distance could be used. Ideally, however, the measurement points are distributed uniformly across the circular path. In order to achieve this distribution, for example, angle value thresholds of the form 360°/n could also be predefined.

A correction of the angle values can be performed as follows. The calculated ellipse coefficients can be used for the correction of the angle value. Amplitude factor pairs and offset pairs correct the XY point value pairs. The angle offset enters the calculation of the rotational angle. The calculated and corrected rotational angle now describes an ideal circular path. Possible deviations occur due to quantization errors. A recalibration can be performed any time so that temperature drifts and/or aging phenomena are compensated without, for example, measuring the temperature or knowing the aging effects.

In a first operation and/or a restart after a system reset, the initial values set for the coefficients are the following:

Initial amplitude factor of the X component is 1.

Initial amplitude factor of the Y component is 1.

X offset of the ellipse center from the origin is 0.

Y offset of the ellipse center from the origin is 0.

Angle offset is 0.

These initial values correspond to the coefficients of an ideal circular path. Alternatively, there may also be used coefficients determined in a previous calibration process.

Furthermore, a zero position is defined. For this, a reference angle is defined, usually at the beginning, which stores a rotational angle zero position. This reference angle also sets the angle of the reference coordinate system with respect to the elliptical form of the non-calibrated sensor system. This angle has to be co-transformed at least in the first transformation of the coordinate system. All further calculated angle values are related to this reference angle.

An externally triggered interrupt may indicate to the controller that a current angle value is to be stored as reference angle. After this adjustment, the self-calibration may start to operate.

An online update of the coefficients is possible. Updating the coefficients during operation and after a first calibration has been carried out, holds significant advantages.

Figure 6:
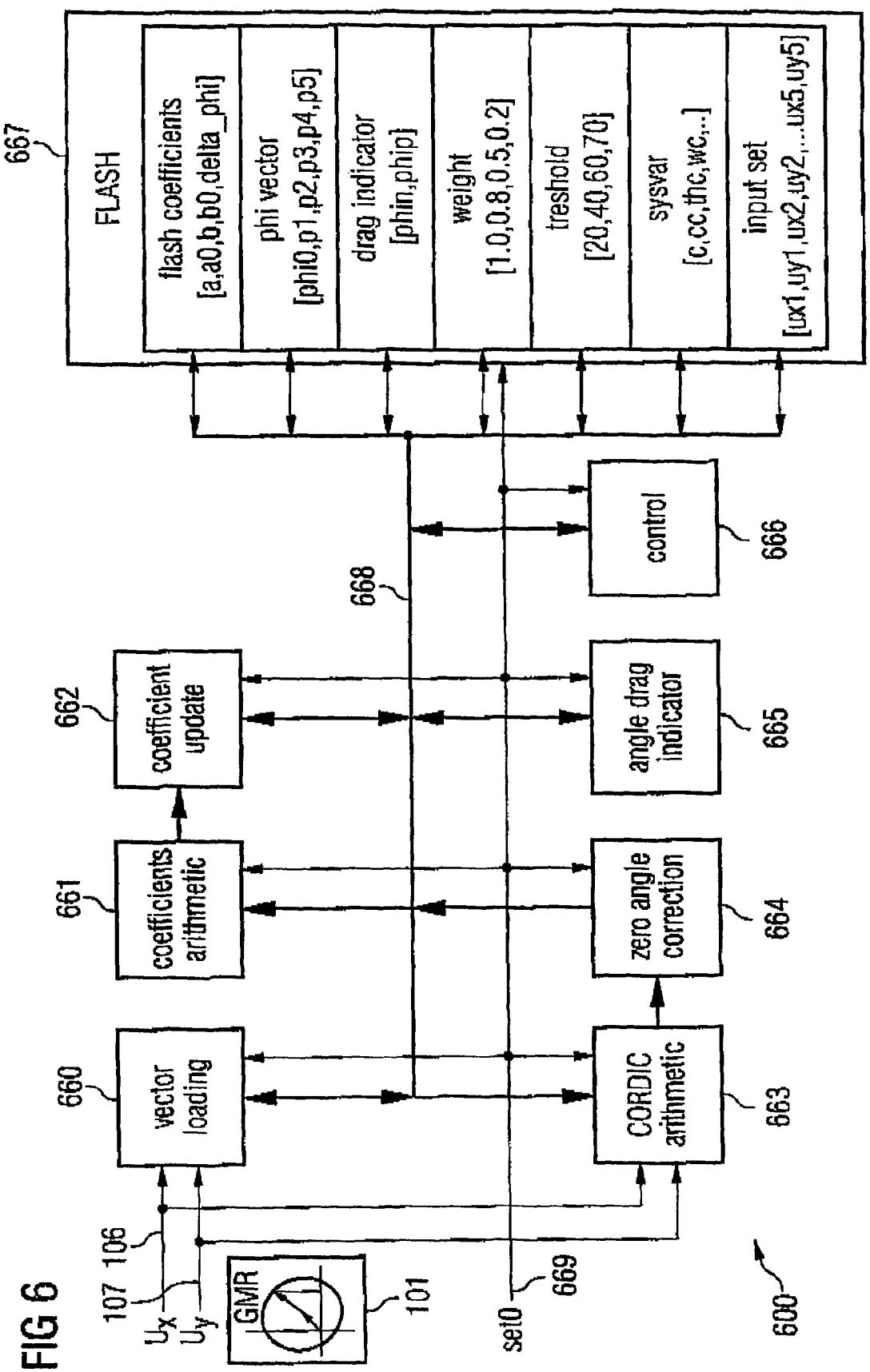
FIG. 6 shows a programming model of the method shown in FIG. 5.

FIG. 6 shows an angle sensor programming model 600, as it may be, for example, used in a microcontroller to realize the angle sensor described in FIG. 1 with a method described in FIG. 5. The programming model is based on X components and Y components of a detected direction provided by a sensor 101, in this case a GMR magnetic field sensor. In this embodiment, there are provided a voltage $U_x$ in X direction 106 and a voltage $U_y$ in Y direction 107. The programming model 600 comprises a vector loading means 660 for loading the components 106, 107 provided by the sensor 101, a coefficients arithmetic means 661 for calculating solution coefficients, a coefficient update means 662 for updating the coefficients provided by the coefficients arithmetic means 661, a CORDIC arithmetic means 663 for performing a CORDIC algorithm to calculate an angle from the components 106, 107 and to provide it to a zero angle correction means 664 performing an adjustment of a calculated angle to a reference direction, an angle drag indicator means 665 for distributing the angle values across the circle, a control means 666 for controlling, and a FLASH means 667 for storing flash coefficients [a, a0, b, b0, delta_phi], a phi vector [phi0, p1, p2, p3, p4, p5], a drag indicator [phi n, phi p], a weighting weight [1.0, 0.8, 0.5, 0.2], a threshold [20, 40, 60, 70], a system variable sysvar [c, cc, thc, vc, . . . ], an input set [ux1, uy1, ux2, uy2, . . . , ux5, uy5].

The means 660 processes the values [ux1, uy1, . . . , ux3, uy3] and [Phi1, . . . , Phi3]. The means 661 processes the values [a, a0, b, b0, d]. The means 662 processes the values [a', a0', b', b0', d]. The means 663 processes the values amplitude, Phi_corr. The means 664 processes the value Phi0. The means 665 processes the values Phi_up, Phi_dn, vec_count, set_count, and the means 666 processes the values Update_weight and Phi_threshold. The described parameter values are selected by way of example.

The means of the programming model 600 are connected to each other via a bus 668. The programming model 600 is additionally supplied a signal 669 in the form of a set0 signal which is connected to the described means.

In the following, there will be described a second method and a second device for adjusting a determination rule according to the present invention. According to this second method, offset, gain and angle errors of an angle sensor may be compensated.

Figure 7:
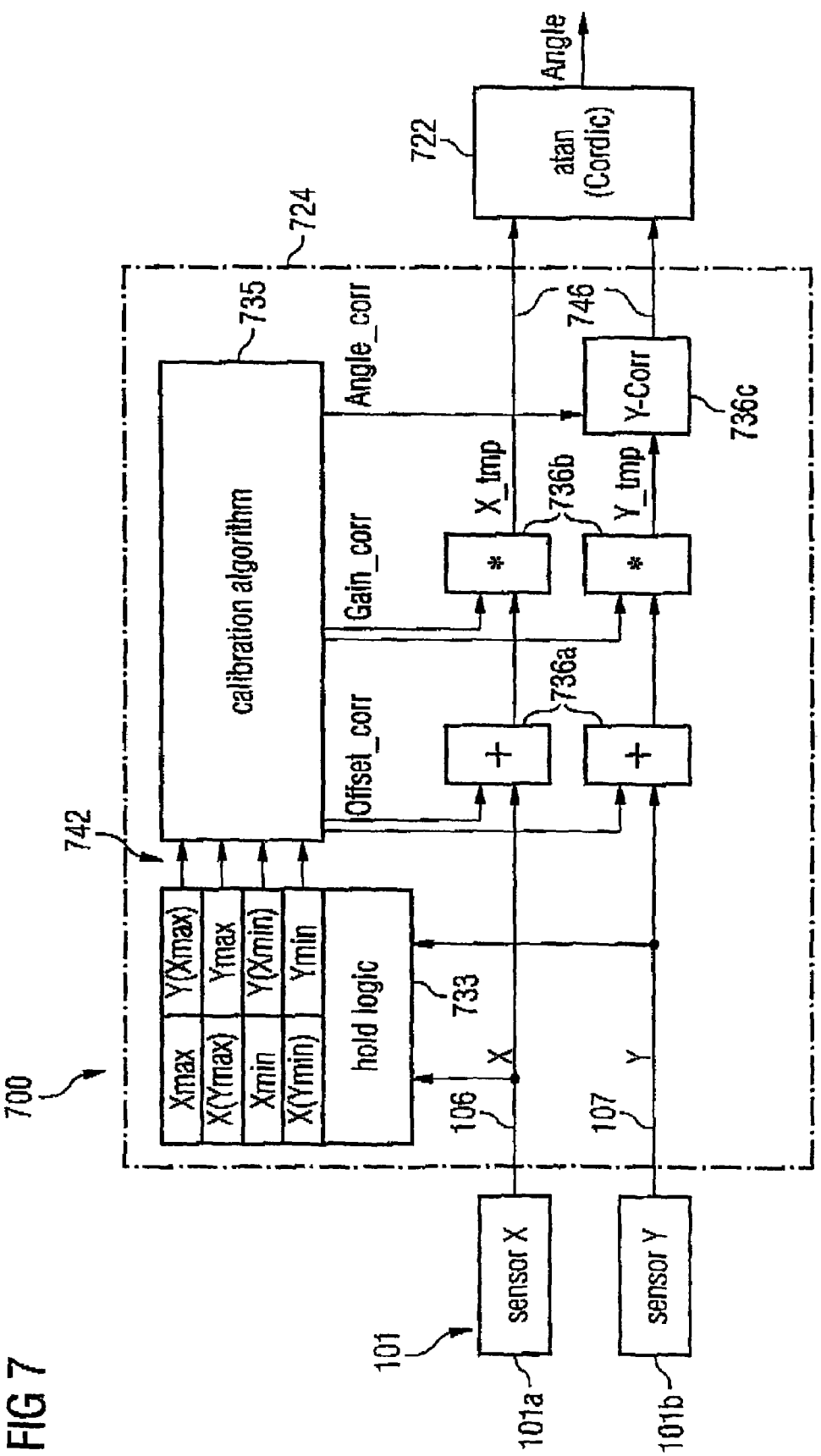
FIG. 7 shows a block circuit diagram of an angle sensor according to an embodiment of the present invention.

FIG. 7 shows a block circuit diagram of a second embodiment of an angle sensor 700 according to the present invention. The angle sensor 700 is designed so that, dependent on different directions in a plane subtended by a first axis and a second axis, component pairs are detected which describe an ellipse. The angle sensor 700 comprises a sensor means 101 designed to output a first component 106 of a direction to be detected along a first axis and a second component 107 of the direction to be detected along a second axis. The first component 106 will be referred to as X component, and the second component 107 will be referred to as Y component in the following. The angle sensor 700 further comprises an angle calculation means 722 for calculating an angle, for example according to the CORDIC algorithm via an arc tangent function, and a device 724 for adjusting a determination rule of the angle sensor 700.

The device 724 for adjusting comprises a detection means in the form of a hold logic 733 and a calibration algorithm means 735 as well as correction means 736a, 736b and 736c. The correction means 736a, 736b are implemented twice respectively, one for each of the components 106 and 107.

The hold logic is designed for receiving values of the X component 106 and the Y component 107. Maximum values and minimum values of the detected components are stored by the hold logic 733. In this embodiment, the hold logic 733 stores a maximum value of the X component Xmax and the associated Y value Y(Xmax), and a maximum Y value Ymax and the associated X component value X(Ymax). The hold logic 733 further stores a minimum X component value Xmin and the associated Y component value Y(Xmin), and a minimum Y component value Ymin and the associated X component value X(Ymin). These maximum and minimum values are either detected during a calibration measurement in which the entire measurement circle is scanned once, or, alternatively, are detected during the running operation and updated continuously. The hold logic 733 is designed to provide the stored values via maximum value and minimum value lines 742 to the calibration means 735.

The calibration means 735 is designed to determine an offset correction factor, a gain correction factor and an angle correction factor from the received maximum values and minimum values. The correction factors are part of the determination rule. In this embodiment, the correction means 736a are designed as adders which receive the offset correction factor Offset_corr from the calibration means 735, and the X component 106 and the Y component 107 from the sensor 101. The correction means 736a are designed to provide both an offset-corrected X component and an offset-corrected Y component to the correction means 736b. The correction means 736b are designed as multipliers which additionally receive a gain correction factor Gain_corr from the calibration means 735 and are designed to multiply the gain correction factor onto the offset-corrected X component and the offset-corrected Y component to obtain an offset-corrected and gain-corrected X component X_tmp and an offset-corrected and gain-corrected Y component Y_tmp. The corrected X component X_tmp is provided to the angle calculation means 722.

The corrected Y component Y_tmp is received by the correction means 736c in the form of a Y component correction means Y-CORR. The correction means 736c is also designed to receive the angle correction factor Angle_corr and to combine it with the corrected Y component Y_tmp to provide an angle-corrected Y component to the angle calculation means 722. The corrected X components and Y components 746 are offset-corrected and gain-corrected and angle-corrected. The angle calculation means 722 is designed for receiving the corrected X and Y components 746 and for calculating a corrected angle designated Angle. The corrected angle Angle corresponds to an actual angle of the direction to be detected by the sensor 101.

Depending on the circumstances, it may be sufficient to perform only an offset correction or only a gain correction. In this case, the outputs of the offset correction means 736a and the outputs of the gain correction means 736b, respectively, are directly connected to the angle calculation means 722. The remaining correction means are not necessary. For performing an offset correction and a gain correction, only the maximum values and minimum values Xmax, Ymax, Xmin, Ymin are required, whereas the associated values of the respective other component are not required. It is also possible to perform an offset correction and/or a gain correction only for the X component or only for the Y component, respectively. In this case, only the maximum value and the minimum value of the component for which the offset correction or the gain correction is to be performed are required. For performing the angle correction, a value of the respective other component which is associated with a maximum value or a minimum value is required in addition to the maximum values and minimum values. For example, the Y component value Y(Xmax) associated with the maximum X component value Xmax is sufficient. The remaining three associated values X(Ymax), Y(Xmin), X(Ymin) are not required. Alternatively, only an X component or only a Y component may be corrected.

Figure 8:
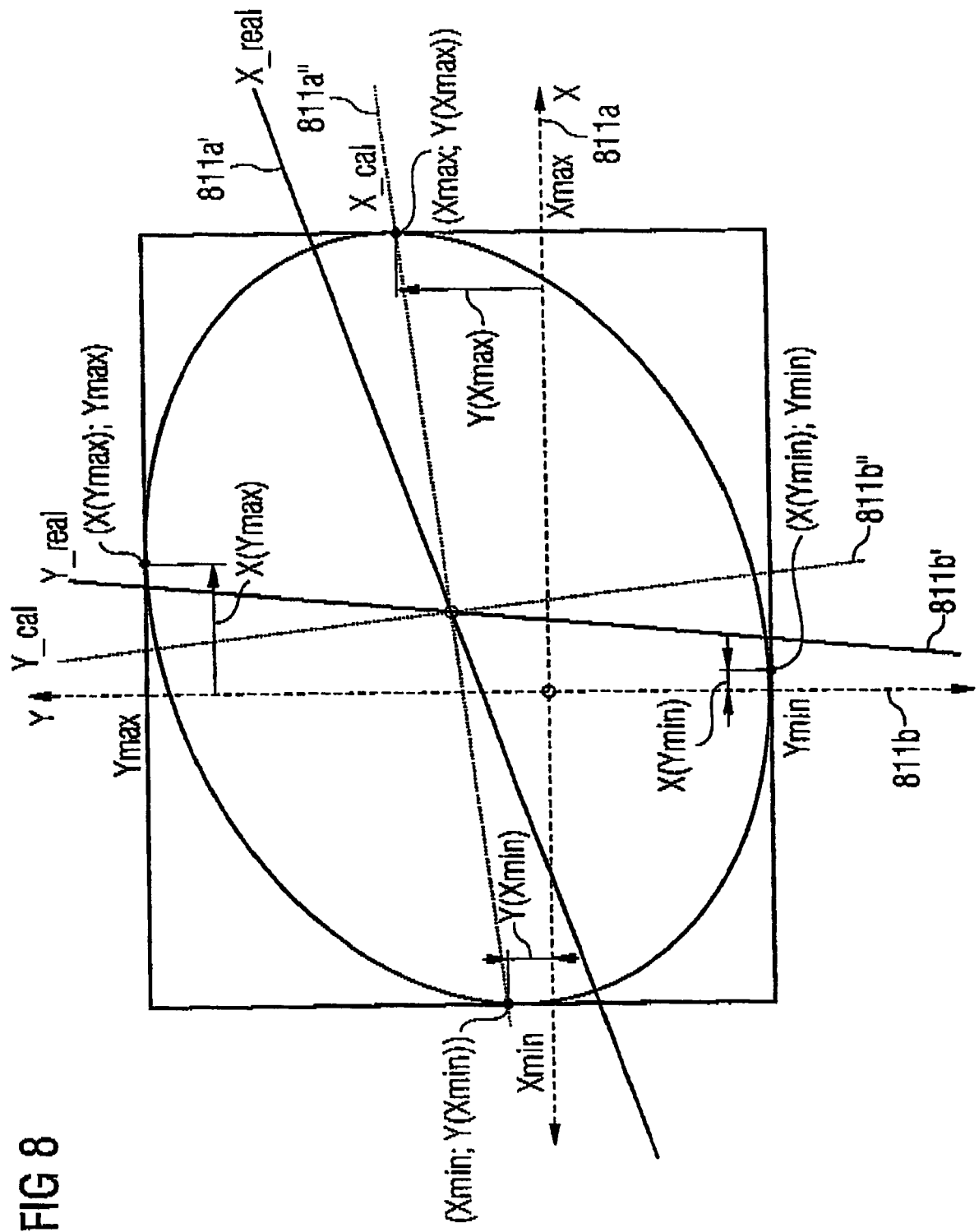
FIG. 8 shows an errored measurement circle according to the present invention.

FIG. 8 shows the position of the maximum values and minimum values described in FIG. 7 on an errored measurement circle 810. A center of the errored measurement circle 801 thus is not located on an intersection point of the X axis 811a and the Y axis 811b. Furthermore, the axes 811a', 811b' of the errored measurement circle in the form of an ellipse are not perpendicular to each other. A perpendicular position is achieved by the error correction so that a calculated X axis 811a" and a calculated Y axis 811b" are perpendicular to each other. The maximum values and minimum values of the X component and the Y component are points of tangency of a rectangle surrounding the ellipse 810, wherein sides of the rectangle are parallel to the X axis 811a and the Y axis 811b, respectively. What is shown is a maximum X value (Xmax; Y(Xmax)), a minimum X value (Xmin; Y(Xmin)), a maximum Y value (X(Ymax); Ymax), and a minimum Y value (X(Ymin); Ymin). These values are stored in the holding means 733 shown in FIG. 7.

Figure 9:
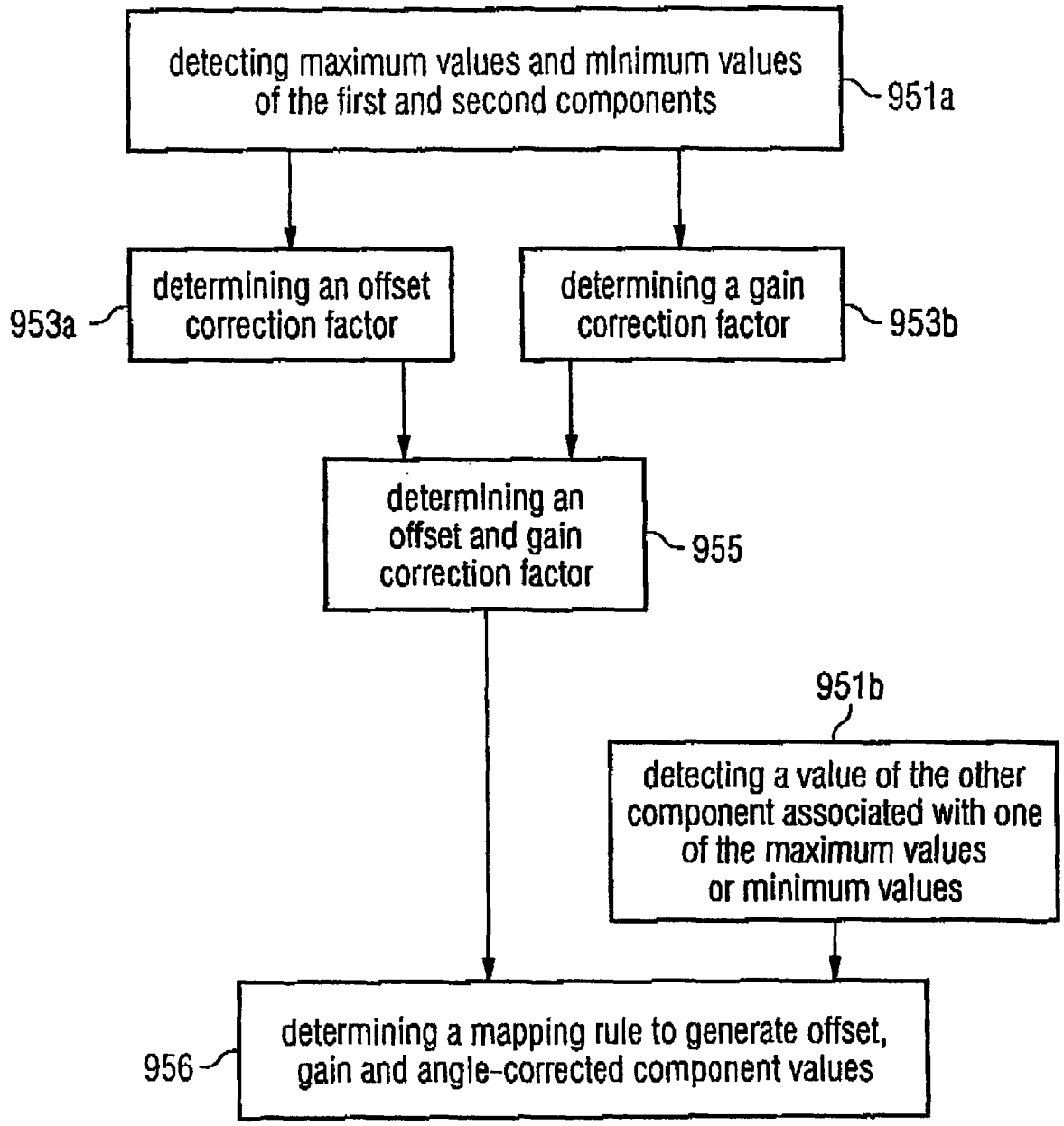
FIG. 9 shows a flow chart of a further method for adjusting according to an embodiment of the present invention.

FIG. 9 shows a flow chart of a method for adjusting a determination rule of an angle sensor, as it can be employed in the angle sensor shown in FIG. 7.

In a first step 951a, maximum values and minimum values of a first component of a direction along a first axis and a second component of the direction along a second axis are detected. From the detected maximum values and minimum values, an offset correction factor is determined for each axis in a second step 952a which may already be used to adjust the determination rule for determining an angle of a direction to be detected so that an offset error is compensated. The detected maximum values and minimum values are further used in a second step 953b for determining a gain correction factor for each axis. The gain correction factor may already be used to adjust the determination rule so that a gain error of the angle to be determined is corrected. In a fourth step 955, an offset gain correction factor is determined from the offset correction factor and the gain correction factor, which may be used to adjust the determination rule so that an offset error and a gain error of the angle to be determined are compensated. In order to allow additional correction of an angle error, a value of the respective other component associated with one of the maximum values or minimum values is additionally detected in a fifth step 951b and used, in a sixth step 956, together with the offset gain correction factor for determining a mapping rule to adjust the determination rule so that offset, gain and angle-corrected and/or axis-angle error-corrected component values are generated from which an offset, gain and angle error-corrected angle value may finally be determined.

The steps of the method described in FIG. 9 may also be processed in parallel. In particular, the first step 951a of detecting and the fifth step 951b may be performed together, and the fourth step 955 of determining and the sixth step 956 of determining may be performed directly after detecting the values in the steps 951a and 951b.

The method described with respect to FIG. 9 is based on the determination of selected points, particularly extremums or zero points, for determining the offset and/or amplitude and/or axis-angle errors.

Figure 10:
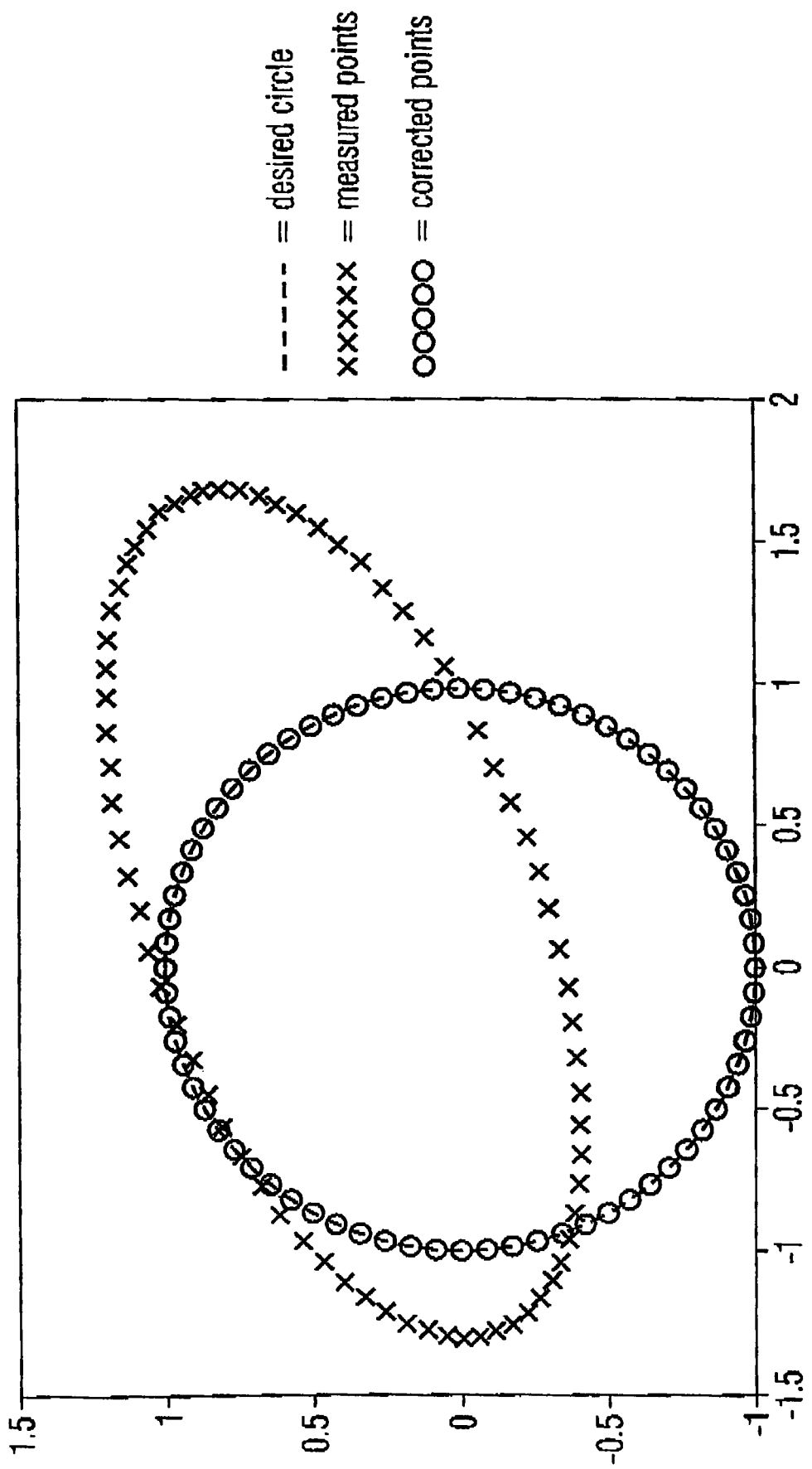
FIG. 10 shows a mapping of an errored measurement circle to an error-corrected measurement circle.

FIG. 10 shows a diagram for illustrating the operation of the inventive methods and devices. An errored angle sensor provides errored measurement points from which an angle of a detected direction is to be determined. In FIG. 10, the measured points are indicated by xxxxx and are located on an ellipse. In order to be able to perform an error-free angle determination, the measured points xxxxx located on an ellipse are mapped onto a circle. The points of the desired circle are indicated by -----. The described methods and devices allow mapping the measured points xxxxx onto the desired points -----. The points corrected according to the inventive methods and devices are indicated by ooooo. As can be seen from FIG. 10, the corrected points ooooo are located on the desired points ----- of the desired circle. Thus, after the correction, an error-free angle determination is possible, for example via an arc tangent function. The corrected points ooooo are simulation results.

The method described with respect to FIGS. 7 to 9 is based on the fact that it is possible to correct an ellipse with four selected points of the same so that ultimately it becomes a circle again. A first point is [Xmax, Y(Xmax)], a second point is [X(Ymax), Ymax], a third point is [Xmin, Y(Xmin)], and a fourth point is [X(Ymin), Ymin]. Basically, a determination of a second order curve, such as the ellipse, requires five points. In this method, however, use is made of the fact that the values min and max ultimately have to be located on the corrected circle so that the respective other component is zero. Thus exactly four points are exactly defined and it is possible to correct offset and gain therewith. The fifth unknown is the dissymmetry, i.e. each value of the other component, in the maximum value of the respective considered component. After the offset and gain compensation, the result is always an ellipse inclined 45 degrees with respect to the coordinate system, or a circle. Thus the respective other components have the same size.

The determination of offset values X_Offset and Y_Offset is performed as follows. The calculations are performed correctly signed.

$$X\_Offset=(X\max+X\min)/2$$

$$Y\_Offset=(Y\max+Y\min)/2$$

The determination of the gain corrections X_Gain, Y_Gain is performed as follows, calculated correctly signed:

$$X\_Gain=(X\max-X\min)/2$$

$$Y\_Gain=(Y\max-Y\min)/2$$

A correction of offset and gain errors X_tmp, Y_tmp is performed as follows:

$$X\_tmp=(X-X\_Offset)/X\_Gain$$

$$Y\_tmp=(Y-Y\_Offset)/Y\_Gain$$

Now the angle error between the sensor X and sensor Y components may be corrected. This error is defined as followed. A is the angle to be measured and F is the error angle. Now the following applies:
sin(F)=Y(Xmax) or X(Ymax) or Y(Xmin) or X(Ymin), as described above.

A backcalculation is performed via the equation sin(A+F)=sin(A)*cos(F)+cos(A)*sin(F), and with the aid of the circle equation sin 2(F)+cos 2(F)=1 and cos(F)=sqrt(1−Y2(Xmax)).

A correction of the Y component is performed via a rotation, X=base(X_cal)F=rotational angle.
sin(A+F)=sin(A)*cos(F)+cos(A)*sin(F)=Y_real, wherein the following applies:
sin(F)=Y(Xmax), cos(F)=sqrt(1−Y²(Xmax)),
sin(A)=Y_corr, cos(A)=$X_{tmp}$.

Of course, the offset and gain correction must also be taken into consideration for Y(Xmax):
sin f=(Y(Xmax)−Y_Offset)/Y_Gain
cos f=sqrt(1−sin f²)
Y_tmp=Y_corr*cos f+X_tmp*sin f
Y_corr=[Ytmp−X_tmp*sin f]/cos f(Y−cal)

The angle to be measured is now A=arc tangent(Y_corr/X_tmp).

In the following, there will be described a third method and a third device for adjusting a determination rule according to the present invention. According to this third method, offset and gain errors of an angle sensor may be compensated.

The method for adjusting a determination rule described subsequently with respect to FIGS. 11 and 12 may be embodied on the angle sensor 700 shown in FIG. 7. For this, the hold logic 733 is designed to store zero passage values of the X component 106 and the Y component 107. A zero passage value is a value where the X component has the value zero or where the Y component has the value zero, respectively. The values of the respective other component associated with these zero passage values are stored in the hold logic 733 and forwarded to the calibration means 735. In this embodiment, however, only an offset correction and a gain correction may be performed. The angle correction means 736c is therefore not required in this embodiment, and the output signals of the gain correction means 736b may be directly connected to the angle calculation means 722.

The method is based on an evaluation of a pair of zero passage values associated with a zero passage of the first component and a pair of zero passage values for the second component associated with a zero passage of the second component.

Figure 11:
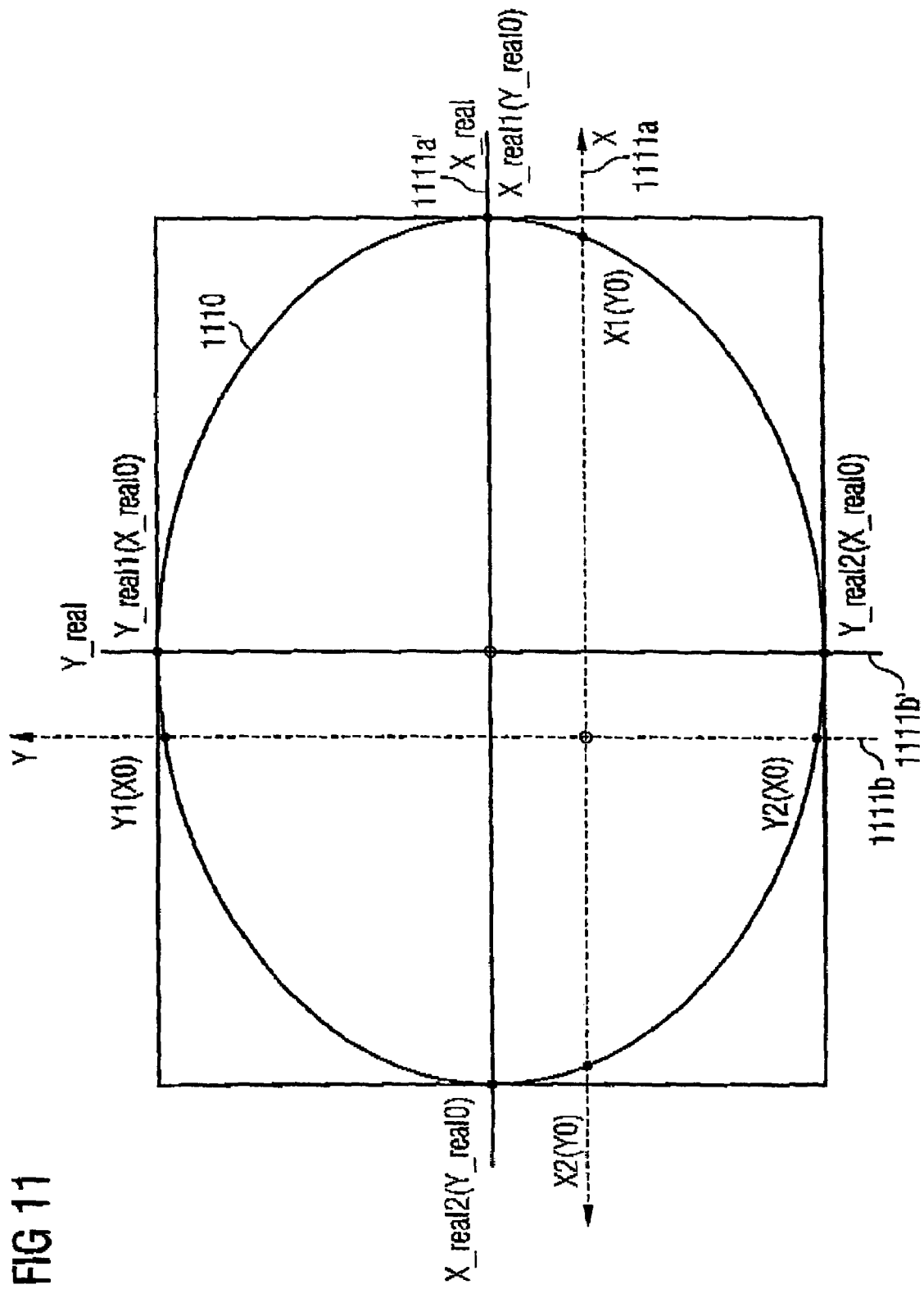
FIG. 11 shows an errored measurement circle according to a further embodiment of the present invention.

FIG. 11 shows an errored measurement circle 1110 in the form of an ellipse. The axes of the ellipse 1111a', 1111b' are indicated by X_real and Y_real and are offset with respect to the circle axes 1111a and 1111b indicated by X and Y. A first zero passage value pair X1(Y0) and the component value pair X2(Y0) correspond to a zero passage of the Y component related to the Y axis 1111b. The zero passage pairs Y1(X0) and Y2(X0) correspond to a zero passage of the X component through the X axis 1111a. The component pairs defined by the ellipse 1110 comprise an offset error and a gain error. This is apparent from the fact that the errored measurement circle 1110 is not a circle, but an ellipse, and by the fact that an intersection point of the ellipse axes 1111a', 1111b' is offset with respect to an intersection point of the circle axes 1111a, 1111b. Intersection points Y_real1 (X_real0), Y_real2(X_real0), X_real1(Y_real0), X_real2 (Y_real0) of the circle axes 1111a, 1111b with the ellipse are offset-corrected zero passage values of the angle sensor.

Figure 12:
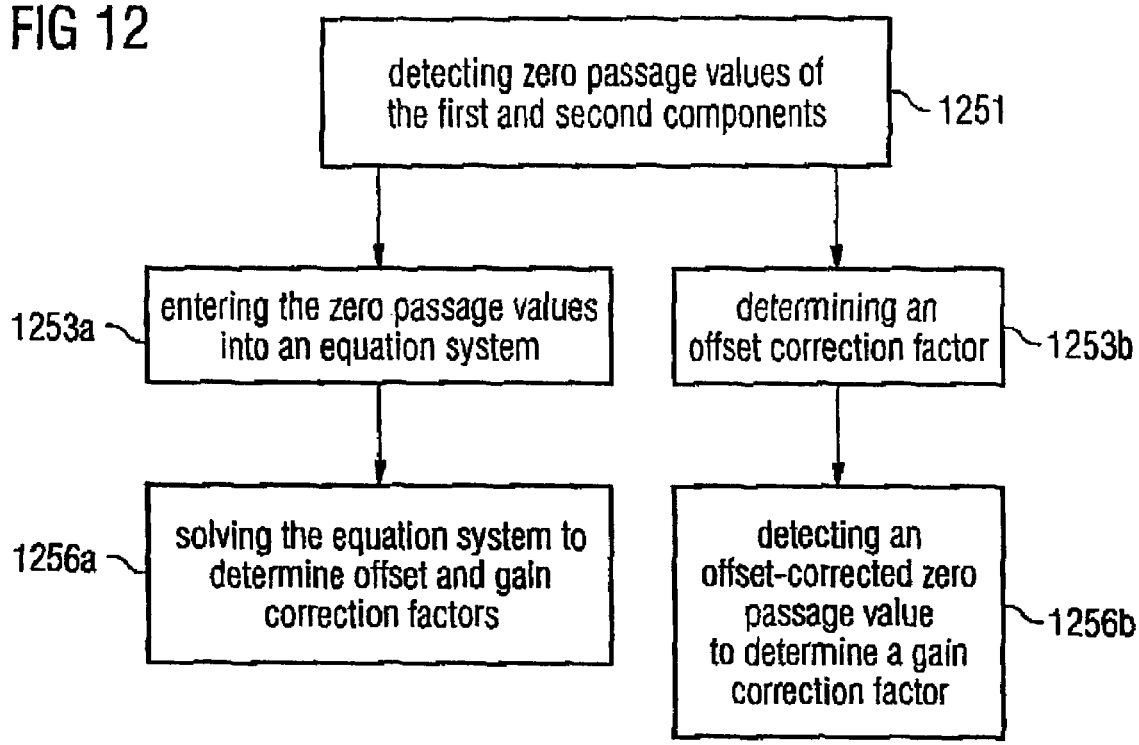
FIG. 12 shows a flow chart of a further method for adjusting according to a further embodiment of the present invention.

FIG. 12 shows a flow chart of the method for adjusting a determination rule of an angle sensor, wherein the angle sensor is designed to scale the two components shown in FIG. 11 with the correction factor.

In a first step 1251, the zero passage values of the first and second components illustrated in FIG. 11 are detected.

According to a first submethod, the zero passage values are entered into an equation system in a second step 1253a.

In a third step 1256*a*, the equation system is solved to determine an offset and a gain correction factor.

According to a further submethod, an offset correction factor is determined in a fourth step 1253*b* based on the detected zero passage values. Based on the offset correction factor, an offset-corrected zero passage value is detected in a fifth step 1256*b* to determine a gain correction factor. This variant is performed in several stages and requires a second measurement to determine the gain correction factor in addition to the offset correction factor. The second measurement is already performed in an offset-corrected way.

According to this method, four distinctive points are used for the determination of an offset correction factor and a gain correction factor, i.e. a first point [X1(Y0), 0], a second point [0, Y1(X0)], a third point [X2, Y(0)], and a fourth point [0, Y2(X0)]. In this variant, it is possible to compensate offset and gain errors with these four points. There may be no angle error between X and Y components.

According to the first submethod, the offset values X_Offset, Y_Offset are determined in a first stage in a calculation performed correctly signed:

$$X\_Offset=(X1(Y0)+X2(Y0))/2$$

$$Y\_Offset=(Y1(X0)+Y2(X0))/2$$

An offset correction is based on the following calculation, wherein offset-corrected values are designated X_tmp, Y_tmp:

$$X\_tmp=(X-X\_Offset)$$

$$Y\_tmp=(Y-Y\_Offset)$$

In a further measurement of the circle and determination of X and Y, wherein the offset should now be corrected and zero, if there is no angle error, the gain corrections X_Gain, Y_Gain are determined correctly signed in a second stage:

$$X\_Gain=X(Y0)$$

$$Y\_Gain=Y(X0)$$

A correction of offset and gain errors is based on the following calculation:

$$X\_tmp2=X/X\_Gain$$

$$Y\_tmp2=Y/Y\_Gain$$

A further possibility according to the second submethod is the direct calculation of the offset and gain values via these four points. For this, an equation system has to be established and solved correspondingly.

Alternatively, the maximum/minimum points and the axis points may be used to compensate the offset, gain and angle errors.

The described embodiments are selected by way of example. In particular, the inventive methods may also be used for other angle sensors which are not based on a magnetic field measurement, but perform an angle determination based on detected direction components. The sensor 100 described in FIG. 1 may also consist only of the elements 101, 122, 136, 135. The sensor 700 described in FIG. 7 may also consist only of the elements 101, 722 and 736*a–c*. Alternatively, also a three-dimensional angle measurement is possible. In this case, a third sensor Z (not shown in the figures) is required to detect a third direction component.

Depending on the circumstances, the inventive methods may be implemented in hardware or in software. The implementation may occur on a digital storage medium, particularly a floppy disc or CD with control signals that may be read out electronically, which may cooperate with a programmable computer system so that the corresponding method is performed. Generally, the invention thus also consists in a computer program product with a program code for performing the inventive method stored on a machine-readable carrier, when the computer program product runs on a computer. In other words, the invention may thus be realized as a computer program with a program code for performing the method, when the computer program runs on a computer.

The described methods may be constructed in hardware, calculated in software on a microcontroller on-chip or externally on a computer. A flow of the methods is possible on a microcontroller or in hardware. In particular, self-calibration is possible with one of the above methods online during running operation.

All methods described here may be used for error compensation, on the one hand when manufacturing an angle sensor, and also during running operation, to compensate offset, amplitude and axis-angle changes during operation, for example due to thermal heating.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for adjusting a determination rule of an angle sensor designed to detect a first component of a direction along a first axis and a second component of the direction along a second axis, and to determine an angle of the direction according to the determination rule based on the first and second components, the method comprising the steps of:

detecting five component value pairs for five different directions, wherein a component value pair includes a first component value for the first component and a second component value for the second component; and adjusting the determination rule depending on the five component value pairs; wherein determining the angle based on the first component and the second component corresponds to an angle measurement of the angle sensor, and wherein the five component value pairs are consecutive first components and second components used for the angle measurement, so that adjusting the determination rule serves for a continuous correction or recalibration of the angle sensor, and so that the actual measurement is not interrupted.

2. A method according to claim 1, wherein the determination rule serves for the compensation of an offset error or an amplitude error or an orthogonality error of the angle sensor.

3. A method according to claim 1, wherein the step of detecting the five component value pairs defines a minimum angle between the directions of the five component value pairs.

4. A method according to claim 1, wherein the step of adjusting comprises a step of entering the five component value pairs into an ellipse equation system and determining at least one ellipse coefficient from the ellipse equation system, and wherein the determination rule is performed depending on the one determined ellipse coefficient or the plurality of determined ellipse coefficients.

5. A method according to claim 1, wherein the step of determining the at least one ellipse coefficient includes a step of forming a calculation matrix and a step of performing a numerical solution algorithm to determine the ellipse coefficients.

6. A method according to claim 1, further comprising a step of adjusting a reference direction as the result of a reference signal, and wherein the angle sensor is designed such that the angle is defined with respect to the reference direction.

7. A method according to claim 1, wherein the direction is a direction of a physical field at the location of the angle sensor.

8. A method for adjusting a determination rule of an angle sensor designed to detect a first component of a direction along a first axis and a second component of the direction along a second axis, and to determine an angle of the direction according to the determination rule based on the first and second components, the method comprising:
  detecting five component value pairs for five different directions, wherein a component value pair includes a first component value for the first component and a second component value for the second component; and
  adjusting the determination rule depending on the five component value pairs;
  wherein an angle measurement area of the sensor is subdivided into a plurality of measurement areas by a plurality of angular thresholds, and wherein the step of detecting is performed depending on the angular thresholds such that the five different directions respectively comprise an angle in a different measurement area.

9. A method for adjusting a determination rule of an angle sensor designed to detect a first component of the direction along a first axis and a second component of a direction along a second axis, and to determine an angle of the direction according to the determination rule based on the first and second components, the method comprising:
  detecting a first maximum value and a first minimum value of a predetermined one of the first and second components;
  adjusting the determination rule depending on the first maximum value and the first minimum value, and
  indicating the angle of the direction according to the determination rule.

10. A method according to claim 9, wherein the step of adjusting includes a step of determining an offset correction factor based on a first averaging of the first maximum value and the first minimum value, and the angle sensor is designed to determine an offset-corrected value for the predetermined one of the first and second components based on the offset correction factor, and to determine the angle based on the offset-corrected value.

11. A method according to claim 10, wherein the step of adjusting further includes a step of determining a gain correction factor based on a second averaging of the first maximum value and the first minimum value to determine a gain-corrected value for the predetermined one of the first and second components based on the gain correction factor, and to determine the angle based on the gain-corrected value.

12. A method according to claim 11, wherein the step of detecting comprises a step of detecting a second maximum value and a second minimum value of the other one of the predetermined first and second components, and wherein the step of adjusting includes a step of determining a further offset correction factor based on a further first averaging of the second maximum value and the second minimum value and further a step of determining a further gain correction factor based on a further second averaging of the second maximum value and the second minimum value to determine an offset-corrected value and a gain-corrected value for the other one of the predetermined first and second components based on the further offset correction factor and the further gain correction factor, and to determine the angle based on the offset-corrected value and the gain-corrected value.

13. A method according to claim 11, wherein the step of detecting comprises a step of detecting a second maximum value and a second minimum value of the other one of the first and second components and a step of detecting, for the direction where the first component assumes the first minimum value or the first maximum value, an associated value assumed by the second component, or of detecting, for the direction where the second component assumes the second minimum value or the second maximum value, an associated value assumed by the first component, and wherein the step of determining comprises determining a mapping rule from the associated value, the first minimum value, the second maximum value, the second minimum value and the second maximum value, and wherein the angle sensor is designed to obtain corrected values from the offset and gain-corrected value based on the mapping rule, and to determine the angle corrected by offset error, gain error and axis-angle error based on these corrected values.

14. A method according to claim 12, wherein the step of determining is performed such that the angle sensor may be designed to add the offset correction factor and the predetermined one of the first and second components correctly signed to obtain the offset-corrected value.

15. A method according to claim 12, wherein the step of determining is performed such that the angle sensor may be designed to multiply the gain correction factor and the predetermined one of the first and second components to obtain the gain-corrected value.

16. A method according to claim 9, wherein the angle sensor is designed to detect the first component by means of a first magnetic field sensor and the second component by means of a second magnetic field sensor, and wherein the step of detecting comprises generating a magnetic field with rotating magnetic field direction and the detection of the first and second magnetic field directions by means of the first and second magnetic field sensors.

17. A method for adjusting a determination rule of an angle sensor designed to detect a first component of a direction along a first axis and a second component of the direction along a second axis, and to determine an angle of the direction according to the determination rule based on the first and second components, the method comprising:
  detecting a pair of first zero passage values for the second component associated with a zero passage of the first component;
  determining a correction factor for the second component based on the pair of first zero passage values, and adjusting the determination rule depending on the correction factor; and
  indicating the angle of the direction according to the determination rule.

18. A method according to claim 17, wherein the step of determining includes a step of entering the first zero passage values into a first equation system, and a step of solving the equation system to obtain the correction factor, wherein the correction factor is an offset or gain correction factor for the second component.

19. A method according to claim 17, wherein the step of determining includes a step of determining a provisional correction factor for the second component based on the pair of first zero passage values, and a step of detecting a provisionally corrected first zero passage value associated with a provisionally corrected first component with inclusion of the provisional correction factor, and determining the correction factor based on the provisional correction factor and the provisionally corrected first zero passage value.

20. A method according to claim 19, wherein the step of determining the provisional correction factor is a first averaging from the pair of first zero passage values.

21. A method according to claim 17, further comprising detecting a first maximum value and a first minimum value of the second component, wherein the step of determining includes a further step of determining a further correction factor for the second component depending on the first maximum value and the first minimum value, and wherein the adjusting further depends on the further correction factor.

22. A device for adjusting a determination rule of an angle sensor designed to detect a first component of a direction along a first axis and a second component of the direction along a second axis, and to determine an angle of the direction according to the determination rule based on the first and second components, the device comprising:
  a detector designed to detect five component value pairs for five different directions, wherein a component value pair includes a first component value for the first component and a second component value for the second component; and
  an adjusting unit designed to adjust the determination rule depending on the five component value pairs;
  wherein determining the angle based on the first component and the second component corresponds to an angle measurement of the angle sensor, and wherein the five component value pairs are consecutive first components and second components used for the angle measurement, so that adjusting the determination rule serves for a continuous correction or recalibration of the angle sensor, and so that the actual measurement is not interrupted.

23. A device for adjusting a determination rule of an angle sensor designed to receive a first component of a direction along a first axis and a second component of the direction along a second axis, and to determine an angle of the direction according to the determination rule based on the first and second components, the device comprising:
  a detector designed to detect a first maximum value and a first minimum value of a predetermined one of the first or second components; and
  an adjusting unit designed to adjust the determination rule depending on the first maximum value and the first minimum value, wherein the device determine the angle of the direction according to the determination rule.

24. A device for adjusting a determination rule of an angle sensor designed to detect a first component of a direction along a first axis and a second component of the direction along a second axis, and to determine an angle of the direction according to the determination rule based on the first and second components, the device comprising:
  a detector designed to detect a pair of first zero passage values for the second component associated with a zero passage of the component;
  a determination unit designed to determine a correction factor for the second component based on the pair of first zero passage values; and
  an adjusting unit designed to adjust the determination rule depending on the correction factor, wherein the device determines the angle of the direction according to the determination rule.

25. A computer readable medium comprising a computer program with a program code for performing the method for adjusting a determination rule of an angle sensor designed to detect a first component of a direction along a first axis and a second component of the direction along a second axis, and to determine an angle of the direction according to the determination rule based on the first and second components, when the computer program runs on a computer, the method comprising the steps of detecting five component value pairs for five different directions, wherein a component value pair includes a first component value for the first component and a second component value for the second component; and adjusting the determination rule depending on the five component value pairs, wherein determining the angle based on the first component and the second component corresponds to an angle measurement of the angle sensor, and wherein the five component value pairs are consecutive first components and second components used for the angle measurement, so that adjusting the determination rule serves for a continuous correction or recalibration of the angle sensor, and so that the actual measurement is not interrupted.

26. A computer readable medium comprising a computer program with a program code for performing the method for adjusting a determination rule of an angle sensor designed to detect a first component of the direction along a first axis and a second component of a direction along a second axis, and to determine an angle of the direction according to the determination rule based on the first and second components, when the computer program runs on a computer, the method comprising the steps of detecting a first maximum value and a first minimum value of a predetermined one of the first and second components; adjusting the determination rule depending on the first maximum value and the first minimum value, and indicating the angle of the direction according to the determination rule.

27. A computer readable medium comprising a computer program with a program code for performing the method for adjusting a determination rule of an angle sensor designed to detect a first component of a direction along a first axis and a second component of the direction along a second axis, and to determine an angle of the direction according to the determination rule based on the first and second components, when the computer program runs on a computer, the method comprising the steps of detecting a pair of first zero passage values for the second component associated with a zero passage of the first component; determining a correction factor for the second component based on the pair of first zero passage values; adjusting the determination rule depending on the correction factor; and indicating the angle of the direction according to the determination rule.

28. A device for adjusting a determination rule of an angle sensor designed to detect a first component of a direction along a first axis and a second component of the direction along a second axis, and to determine an angle of the direction according to the determination rule based on the first and second components, the device comprising:
  a detector designed to detect five component value pairs for five different directions, wherein a component value pair includes a first component value for the first component and a second component value for the second component; and an adjusting unit designed to adjust the determination rule depending on the five component value pairs;

wherein an angle measurement area of the sensor is subdivided into a plurality of measurement areas by a plurality of angular thresholds, and wherein the step of detecting is performed depending on the angular thresholds such that the five different directions respectively comprise an angle in a different measurement area.

29. A computer readable medium with a program code for performing the method for adjusting a determination rule of an angle sensor designed to detect a first component of a direction along a first axis and a second component of the direction along a second axis, and to determine an angle of the direction according to the determination rule based on the first and second components, when the program code runs on a computer, the method comprising the steps of detecting five component value pairs for five different directions, wherein a component value pair includes a first component value for the first component and a second component value for the second component; and adjusting the determination rule depending on the five component value pairs, wherein an angle measurement area of the sensor is subdivided into a plurality of measurement areas by a plurality of angular thresholds, and wherein the step of detecting is performed depending on the angular thresholds such that the five different directions respectively comprise an angle in a different measurement area.

* * * * *